United States Patent
Edwards et al.

(10) Patent No.: US 12,394,221 B2
(45) Date of Patent: *Aug. 19, 2025

(54) SYSTEM AND METHOD FOR OPTIMIZING CONTAINER CONTENTS

(71) Applicant: Symbotic LLC, Wilmington, MA (US)

(72) Inventors: James Benjamin Edwards, Centerton, AR (US); Paul E. Durkee, Centerton, AR (US); Brian C. Roth, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,125

(22) Filed: Mar. 4, 2024

(65) Prior Publication Data

US 2024/0212368 A1    Jun. 27, 2024

Related U.S. Application Data

(63) Continuation of application No. 17/517,748, filed on Nov. 3, 2021, now Pat. No. 11,948,375.

(60) Provisional application No. 63/111,353, filed on Nov. 9, 2020.

(51) Int. Cl.
*G06V 20/64* (2022.01)
*G06Q 10/0631* (2023.01)
*G06T 7/62* (2017.01)
*G06V 10/75* (2022.01)

(52) U.S. Cl.
CPC ....... *G06V 20/64* (2022.01); *G06Q 10/06313* (2013.01); *G06T 7/62* (2017.01); *G06V 10/751* (2022.01)

(58) Field of Classification Search
CPC .............. G06V 20/64; G06V 10/751; G06Q 10/06313; G06Q 10/087; G06T 7/62
See application file for complete search history.

(56) References Cited

U.S. PATENT DOCUMENTS

| | | |
|---|---|---|
| 8,196,822 B2 | 6/2012 | Goncalves |
| 9,092,698 B2 | 7/2015 | Buehler |
| 9,311,645 B2 | 4/2016 | Edwards |
| 9,691,114 B2 | 6/2017 | Ashrafzadeh |
| 10,127,520 B2 | 11/2018 | Kundra |

(Continued)

OTHER PUBLICATIONS

"Roger Appleby et. al., Millimeter-Wave and Submillimeter-Wave Imaging for Security and Surveillance, Proceedings of the IEEE, vol. 95, Issue: 8, Aug. 2007, pp. 1683-1690" (Year: 2007).*

(Continued)

*Primary Examiner* — Chineyere Wills-Burns
*Assistant Examiner* — Phuong Hau Cai
(74) *Attorney, Agent, or Firm* — Fitch, Even, Tabin & Flannery LLP

(57) ABSTRACT

The contents of totes and the amount a tote container is filled are monitored. A central database stores product dimensions and tote dimensions as well as a percentage of which a tote is to be filled. Image scanners that obtain three-dimensional images are used to determine if the actual dimensions of the tote, the product, and the fill amount are consistent with the expected or optimal values of these characteristics. When there is a discrepancy between measured and expected values, then one or more actions can be taken.

20 Claims, 8 Drawing Sheets

(56) References Cited

U.S. PATENT DOCUMENTS

| | | |
|---|---|---|
| 10,558,944 B1 * | 2/2020 | Elazary ............... G06Q 10/087 |
| 10,932,103 B1 | 2/2021 | Mathiesen |
| 11,666,944 B1 * | 6/2023 | De La Rosa ............. B07C 5/36 |
| | | 209/549 |
| 11,948,375 B2 * | 4/2024 | Edwards ................ G06V 20/64 |
| 2018/0305123 A1 | 10/2018 | Lert, Jr. |
| 2019/0016533 A1 * | 1/2019 | Post ....................... B65G 1/137 |
| 2019/0370738 A1 | 12/2019 | Medina |
| 2022/0147733 A1 | 5/2022 | Edwards |

OTHER PUBLICATIONS

USPTO; U.S. Appl. No. 17/517,748; Non-Final Rejection mailed Jun. 23, 2023; (pp. 1-25).
USPTO; U.S. Appl. No. 17/517,748; Notice of Allowance and Fees Due (PTOL-85) mailed Dec. 6, 2023; (pp. 1-13).

* cited by examiner

SYSTEM AND METHOD FOR OPTIMIZING CONTAINER CONTENTS

CROSS-REFERENCE TO RELATED APPLICATIONS

This application is a continuation of U.S. application Ser. No. 17/517,748, filed Nov. 3, 2021, which claims the benefit of U.S. Provisional Application No. 63/111,353, filed Nov. 9, 2020, both of which are incorporated herein by reference in their entireties.

TECHNICAL FIELD

This invention relates to optimizing the content of containers and, in one example, tote containers.

BACKGROUND

A tote is any type of container that can be used to hold and store products as the products are moved from location to location. Product totes are used to conveniently move or transport products within warehouses, retail stores, and other such places. For example, products may be delivered by shippers to a store in crates and then the products are placed in totes at a picking station at the store. After they are filled, the totes are moved within the retail store so that the products can be placed on shelves (or other product displays) and sold to customers.

However, sometimes the totes are utilized in inefficient ways. For example, the tote may not be filled to an optimal level (e.g., with empty space or volume). In other cases, the optimal mix of products is not inserted into the tote. These types of issues result in more totes being used to move products than are really needed, and/or more trips needed by store employees (or automated vehicles) to move products within the store, distribution center, or warehouse.

BRIEF DESCRIPTION OF THE DRAWINGS

The above needs are at least partially met through the provision of approaches for monitoring tote contents, wherein.

DETAILED DESCRIPTION

Figure 1:
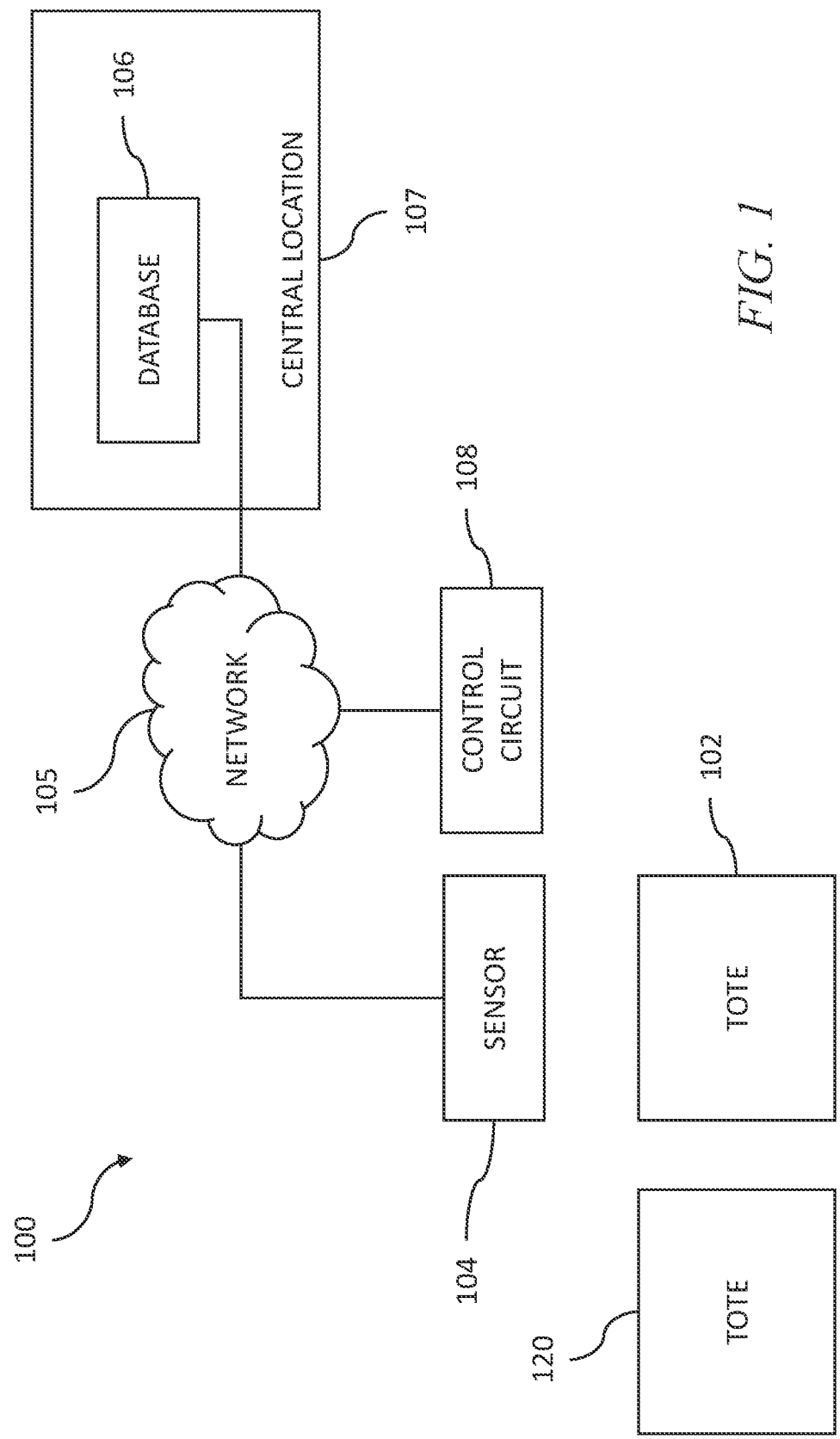
FIG. 1 comprises a diagram of a system as configured in accordance with various embodiments of these teachings.

In aspects, the approaches described herein provide for the tracking the contents of totes and the amount a tote container (sometimes also referred to as "tote" herein) is filled. A central database stores product dimensions and tote dimensions as well as a percentage of which a tote is to be filled (e.g., 70% of the volume of a tote is to be filled). Three-dimensional images of the tote container and its contents are analyzed to determine if the actual dimensions of the tote, the product, and the fill amount are consistent with the expected or optimal values of these characteristics. When there is a discrepancy between measured and expected values, then one or more actions can be taken. For example, if the fill percentage is too small, then the amount of products inserted into the container can be increased. In another example, when the tote is found to be too small, another container with increased dimensions can be used. Other examples are possible.

The approaches provided herein identify discrepancies between expected and actual products, product size, and quantity (or other discrepancies involving other expected and actual product or packaging characteristics) at either (or potentially both) of product receiving (e.g., decant at a picking station or some other location) and product shipping (e.g., picking). In other words, these discrepancies can be identified as products are received (at some location) or as products are shipped, e.g., picked (moved to location in the store), from some location.

Advantageously and in other aspects, the approaches described herein determine how efficiently a tote container is being filled and monitor the tote fill amount or rate (e.g., in three dimensional count units) in totes. These approaches allow for a precise determination of the fill rate of the products in the tote and provide an automated system to simultaneously confirm and monitor inventory. If it is determined that there is consistently available space or volume in totes (i.e., the totes are being filled too conservatively) the fill rates of totes can be adjusted. The dimensions of the products in the tote can be confirmed to be as expected by comparing the measured dimensions to the expected dimensions in an item file (where the predetermined dimensions are stored).

In aspects, these approaches use a data-confirmed feedback loop to predict tote fill rates or volume. In other aspects too, the fill rate can be adjusted and a more conservative fill rate can be used to avoid item overfill of the totes.

Some items such as bags do not have rigid dimensions. And, in other cases, the dimensions of items or products change over time. Additionally, some items have unusual shapes and, because of this, it becomes difficult to predict how they will fill a tote or container. And, sometimes manufacturers will change the shape of their products and the item size is not updated in store records. In the present approaches, these situations are handled because the products are measured and the item file (as described elsewhere herein) can be updated as appropriate. The amount of products and/or the size of the tote container can be adjusted to address these situations.

In other examples, a case of products may be decanted into a tote. The case may include products of the same type. In aspects, an assumption is made that the cubic volume of products in the case will fill the tote to that volume. If the volume of product within the case is analyzed and the case is not well packed, the tote fill rate (ratio of product to consumed volume) may be similar or less than the case packed volume. Alternatively, if the case is well packed, the tote fill rate may be less after being placed randomly into a tote. By "well packed," it is meant that the space or volume in the container is used to achieve a maximum efficiency.

In still other aspects, these approaches advantageously use a three-dimensional millimeter wave scan to determine how much product is in a tote and the tote fill rate. By using these two values in combination, a ratio of product count to tote fill percentage enables a better estimation for future allocation of totes.

In many of these embodiments, a system for determining information concerning products being carried by tote containers includes a first tote container, at least one sensor, a database, and a control circuit. The first tote container is filled with one or more products.

The sensor (or sensors) obtains three-dimensional image information regarding the tote container and the one or more products. The three-dimensional image information include first dimensions of the tote container and second dimensions of the one or more products.

The database is disposed at a central location. The database stores the predetermined (expected) dimensions of the first tote container, predetermined dimensions of each of the one or more products, and target container product fill amount.

The control circuit is coupled to the database and to the sensor (or sensors). The control circuit is configured to compare the first dimensions of the tote container to the predetermined dimensions of the tote to determine existence of a first discrepancy. The control circuit is configured to compare the second dimensions of the one or more product to the predetermined dimensions of the one or more products to determine existence of a second discrepancy, analyze the three-dimensional image information to determine a product fill amount for the first tote container, and compare the product fill amount of the first tote container to the target container product fill amount to determine existence of a third discrepancy. When one or more of the first discrepancy, the second discrepancy, or the third discrepancy exist, the control circuit is configured to take an action. The action is one of: selecting a second tote container that is to be filled subsequent to the filling of first tote container (and subsequent to the analysis), the second tote container having different dimensions than the first time container; increasing the number of products inserted into a second tote container as compared to the number of products inserted into the first tote container; decreasing a number of products inserted into a second tote container as compared to the number of products inserted into the first tote container; or adjusting the target fill amount.

In other aspects, the control circuit analyzes the three-dimensional image information to determine any damage for the one or more products. When damage is determined, the number of products inserted into the second tote container as compared to the number of products inserted into the first tote container is decreased. In other examples, the damage is linked to the first tote container. This can be used for other analysis purposes. Messages can be sent to employees alerting them to the damage.

In some examples, the at least one sensor comprises a millimeter wave sensor. Other examples of sensor technologies are possible.

In still other examples, the at least one sensor comprises a first sensor and a second sensor. Each of the first sensor and the second sensor uses a different kind of three-dimensional image sensing technology.

In yet other aspects, the target container fill amount comprises a percentage. In still other aspects, the three-dimensional image information is analyzed to determine an amount of empty space in the first tote container.

In other examples, the control circuit is deployed at a picker station. In still other examples, the target container fill amount is part of business rules of how much the first tote container should be filled.

In others of these embodiments, a method for determining information concerning products being carried by tote containers comprises providing a first tote container. The first tote container is filled with one or more products.

At least one sensor is provided. The at least one sensor obtains three-dimensional image information regarding the tote container and the one or more products. The three-dimensional image information includes first dimensions of the tote container and second dimensions of the one or more products.

A database is provided at a central location. The predetermined dimensions of the tote, predetermined dimensions of each of the one or more products, and target container product fill amount are stored at the database.

A control circuit compares the first dimensions of the tote container to the predetermined dimensions of the tote to determine existence of a first discrepancy (e.g., whether the predetermined dimensions that are stored match the actual dimensions that are determined by a tolerance). The control circuit compares the second dimensions of the one or more product to the predetermined dimensions of the one or more products to determine existence of a second discrepancy (e.g., whether the predetermined dimensions stored match the actual measured dimensions of the product within a tolerance). The predetermined dimensions, in aspects, may be manually entered by a user or obtained by the manufacturer of the tote or the product.

The control circuit analyzes the three-dimensional image information to determine a product fill amount for the first tote container (e.g., the volume of the first tote container is 70% filled), and compares the product fill amount of the first tote container to the target container product fill amount to determine existence of a third discrepancy (e.g., whether the predetermined target fill amount matches the determined filled amount that was measured).

When one or more of the first discrepancy, the second discrepancy, or the third discrepancy exists, the control circuit takes an action.

The action is one of selecting a second tote container that is to be filled subsequent to the first tote container, the second tote container having different dimensions than the first time container; increasing the number of products inserted into a second tote container as compared to the number of products inserted into the first tote container; decreasing a number of products inserted into a second tote container as compared to the number of products inserted into the first tote container; or adjusting the target fill amount. Other examples of actions are possible. The action can then be implemented and further follow-up actions can occur such as actually filling the second (and subsequent) tote containers.

It will be appreciated that many of the concepts described herein are described with respect to tote containers. However, these approaches are also applicable to all types of containers, boxes, crates, packages, or any approaches or structures for moving products or any other type of item from one location to another location.

Referring now to FIG. 1, one example of a system 100 that employs the present approaches is described. The system 100 includes a first tote container 102, a sensor 104, a database 106, and a control circuit 108. The first tote container 102 is filled with one or more products.

The first tote container 102 is any type of container that can be used to transport or carry products within any type of area or location such as a building, a retail store, a distribution center, a warehouse, and so forth. The first tote container 102 may be internally divided (e.g., using dividers or any other type of separator) into different areas, volumes, compartments, and/or spaces. In one example, different products (of different types, dimensions, weights, colors, manufacturers, to mention a few examples) may be placed into these different areas or volumes, or within the same areas or volumes. The first tote container 102 may be constructed using any combination of materials (e.g., plastic, cardboard, or metal to mention a few examples).

The sensor 104 obtains three-dimensional image information regarding the tote container and the one or more products. The three-dimensional image information including first dimensions of the tote container 102 and second dimensions of the one or more products. In some examples, the sensor 104 comprises a millimeter wave sensor. Other examples of sensors using other types of technology (and/or obtaining two-dimensional information) are possible.

The sensor 104 may alternatively comprise multiple sensors. In one example, the sensor 104 comprises a first sensor and a second sensor. In one aspect of this approach, each of the first sensor and the second sensor uses a different kind of three-dimensional image sensing technology.

When a millimeter sensor type sensor is used as the sensor 104 and in aspects, it obtains images to identify the shape, dimensions and orientation of the products or items in the tote. In aspects, these images are three-dimensional images and can show filled and empty space within the tote container. Other examples of sensors (e.g., that obtain images in other radiation frequencies) such as x-rays may also be used. In examples, the sensor 104 transmits millimeter waves from antennas. The wave energy reflected back from the tote container 102 (and the contents of the tote container 102) is used to construct images, which are analyzed by the control circuit 108.

In other examples and as mentioned, different types of sensors can be used for different purposes (e.g., obtain images or information about different aspects and/or contents of a tote). In other words, multiple scanning devices using different types of scanning technology can be deployed. In one example, a camera (a first sensor) obtains images in the visible light spectrum of the outside of the tote container 102, while a second scanning device (using a different scanning technology) such as millimeter wave technology is used to obtain images of the contents of the container 102. In this example, a first analysis can be undertaken of the visible light camera images, while a second analysis can be performed on images (or other obtained information) obtained from the scans made by the millimeter technology.

When more than one sensor is used, information obtained by one sensor can be verified or supplemented by information from a different sensor. For example, if information is unavailable from the images obtained by one sensor (e.g., information indicating a particular sub-volume or area of the tote cannot be scanned), then information from the other sensor can be used to fill in the missing information. In other examples, multiple sensors use the same scanning technology (e.g., when two or more sensors are used, all of the sensors use millimeter scanning technology).

The database 106 is disposed at a central location 107. The central location 107 may be a company headquarters or at some other location remote from the retail store, distribution center, or warehouse where other system elements are located. Alternatively, the database 106 may be disposed of at the retail store, distribution center, or warehouse. The database 106 stores the predetermined (expected) dimensions of the tote container 102, predetermined (expected) dimensions of each of the one or more products, and a target container product fill amount. In aspects, the target container fill amount comprises a percentage. In still other examples, the target container fill amount is part of a set of business rules of how much the first tote container should be filled. The target fill amount in some examples is the volume amount that a user desires to fill tote containers. For example, a user may wish to fill the tote containers to be 75% full by volume. Other examples and percentages are possible.

The control circuit 108 is coupled to the database and to the sensor 104. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 108 may be configured (for example, by using corresponding programming stored in a memory as will be well understood by those skilled in the art) to carry out one or more of the steps, actions, and/or functions described herein. In this example, the control circuit 108 is disposed of at the retail store, distribution center, or warehouse. However, it will be appreciated that the control circuit 108 may also be disposed at the central location 107.

A communication network 105 couples the control circuit 108 to the database 106. The communication network 105 may be any suitable electronic communication network (for combination of networks) such as a cellular network, wireless networks, data networks, or the internet.

In one example of the operation of the system of FIG. 1, the control circuit 108 is configured to receive three-dimensional images from the sensor 104 and analyze this information. The information includes images of the tote container 102 and products (contents) of the tote container 102. Using image processing techniques known to those skilled in the art, the dimensions, conditions, and other characteristics of the tote container 102 and the contents of the tote container 102 are determined.

The control circuit 108 is then configured to compare the first dimensions of the tote container 102 to the predetermined dimensions of the tote container 102 to determine existence of a first discrepancy. The control circuit 108 is configured to compare the second dimensions of the one or more product to the predetermined dimensions of the one or more products to determine existence of a second discrepancy, analyze the three-dimensional image information to determine a product fill amount for the first tote container 102, and compare the product fill amount of the first tote container 102 to the target container product fill amount to determine existence of a third discrepancy.

The predetermined dimensions of the tote container 102 may be entered by a user into the database 106 or supplied by a manufacturer (and entered into the database 106). In one example, a user manually measures the tote container 102 (e.g., using rulers or other measuring devices) and enters this into the database 106 with an electronic device such as a smartphone or computer. Similarly, the predetermined dimensions of the product or items in the tote container 102 can also be entered manually by the user (e.g., using rules or other measuring devices to obtain the dimensions). These dimensions for the tote container 102 and the products may include lengths, widths, depths, shapes, diameters, radii, circumferences, weights, heights, densities, or any other dimension (or potentially other characteristic) that describes the tote or product. The target container fill amount may also be entered by the user and may be based upon various factors such as previous experience with the tote containers or recommendations made by the manufacturer or others. The predetermined item or product information can be stored in an item file at the database 106 and the predetermined tote information stored in another file at the database 106. The files may be of any data structure or format.

When one or more of the first discrepancy, the second discrepancy, or the third discrepancy exist, the control circuit 108 is configured to determine and/or take an action. In examples, the action is one of: selecting a second tote container 120 that is to be filled subsequent to the first tote container 102, a second tote container 120 having different dimensions than the first tote container 102; increasing the number of products inserted into a second tote container 120 as compared to the number of products inserted into the first tote container 102; decreasing a number of products inserted into a second tote container 120 as compared to the number of products inserted into the first tote container 102; or adjusting the target fill amount. In yet other aspects, the three-dimensional image information is analyzed to determine an amount of empty space in the first tote container 102 and/or the amount of filled space in the tote container 102. It will be appreciated that these actions are physical actions that cause an interaction of elements in a physical environment. For example, tote containers are filled with products, moved within physical spaces, or removed (and placed in an area where damaged or sub-optimal containers are stored) to mention a few examples.

As mentioned, the control circuit 108 may be deployed in various locations. In some examples, the control circuit 108 is deployed at a picker station within the retail store, distribution center, or warehouse. In other examples, the control circuit 108 is deployed at the central location (e.g., the same central location as the database 106). In other examples, the information obtained by the sensor 104 may be stored locally (e.g., at the picking station) and periodically uploaded to the central location 107 for processing.

It will be appreciated that the actions described can be taken at various different times. For example, after the first tote container 102 is analyzed the results of the analysis are applied at or with respect to the second tote container 120 (but the first tote container 102 and its contents are unchanged). Thus, the results of the analysis of the first tote container 102 are used in arranging tote containers (e.g., at the picking station) to be filled subsequent to the first tote container 102 (i.e., future tote containers such as the second tote container 120 in this example).

In another example the first tote container 102 and all future tote containers (e.g., tote container 120) are adjusted (their contents altered or the tote containers themselves physically changed) based upon the results of the analysis (i.e., the determination as to whether any discrepancies exist).

In other examples, the sensor 104 can be used to determine if damage exists either to the first tote container 102, the contents (e.g., products in the tote, or both). For example, when the tote container 102 is used to transport fruit or vegetables, the scans can be analyzed to determine damage (or spoilage) of these products. When it is determined that the item are damaged adjustments to the tote container (e.g., exchanging the tote container 102 for a larger container) or products (e.g., decreasing the number of products) can be made.

The tote container 102 can be divided into portions (or sub-volumes) with dividers (or other approaches or structures). In one example, the divider is a sheet of plastic, metal, or cardboard that divides a box-like tote container into two volumes. In this case, the sensor 104 may be used to obtain information about the two half-volumes and separate calculations can be performed on the two half volumes.

It will further be appreciated that more than one control circuit can be utilized in these approaches. For example, a second control circuit may be disposed at the central location 107 and may be structured the same or similarly to the control circuit 108. The second control circuit may serve as a back-up to the control circuit 108 and/or monitor the processing performed by the control circuit 108.

In still aspects, the cubic volume of products and/or totes can be tracked over time. The cubic utilization of totes can also be tracked. For example, x percent of the cubic volume of the tote being filled up is tracked. In one example, the cubic volume is measured to be 100 cubic inches and the products in the tote measure 30 cubic inches for a 30 percent utilization rate. If a tote is divided, these approaches allow for a determination and tracking of each compartment. For instance, where the tote is divided into two portions, individual fill rates for each portion can be determined. For example, 40 percent of the 50 percent volume may be determined to be filled.

Figure 2:
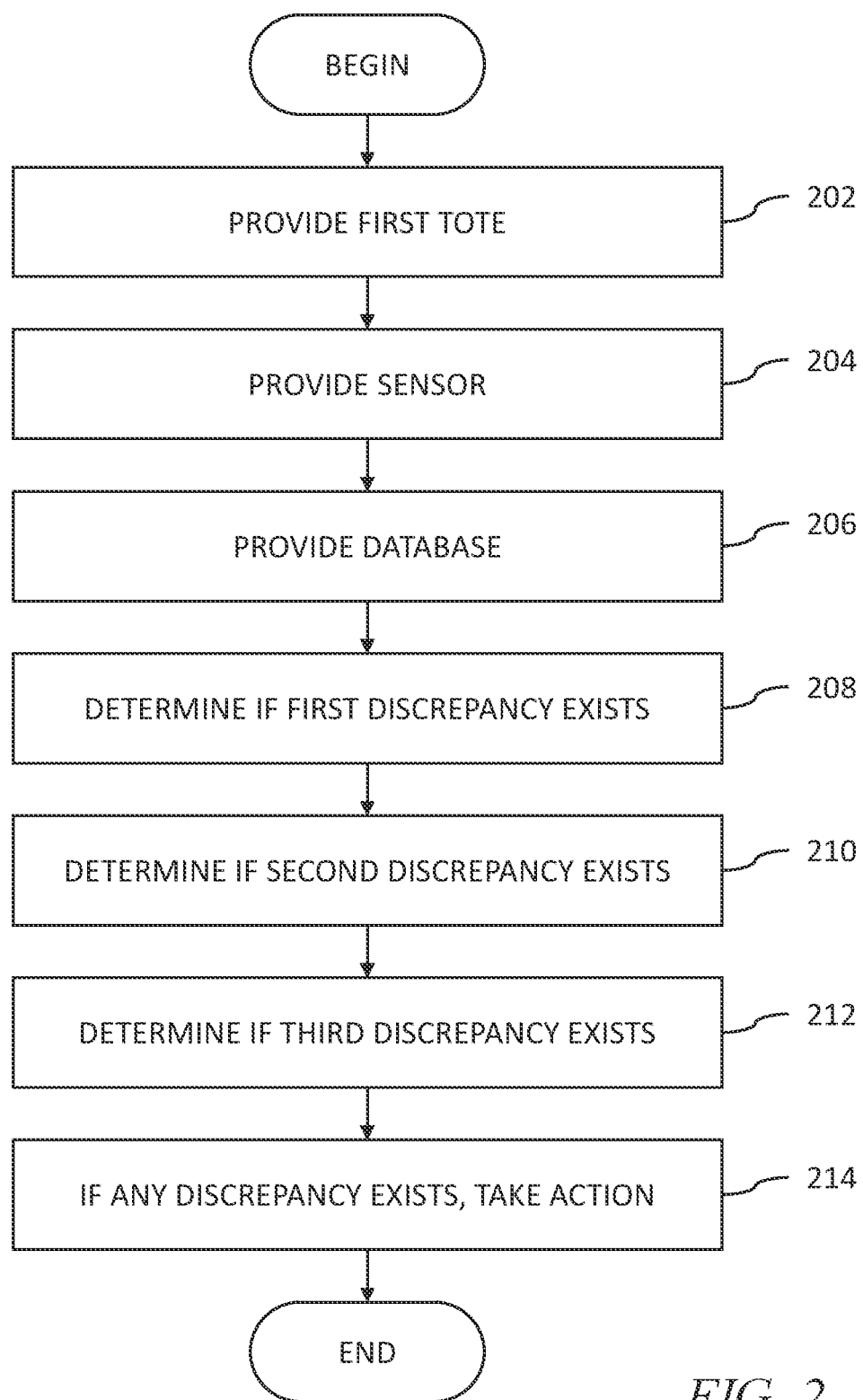
FIG. 2 comprises a flowchart as configured in accordance with various embodiments of these teachings.

Referring now to FIG. 2, a method for determining information concerning products being carried by tote containers is described.

At step 202, a first tote container is provided. The first tote container is filled with one or more products. The products can be any type of product that are sold in stores, online, or any other selling method. The first tote container may be any type of storage structure that can store these products as the products are moved from one location to another location. In one example, the first tote container is a box structure that can be carried by a person or an automated vehicle from a picking station to a location in the store where the product is being sold. In aspects, delivery trucks unload various products at or near the picking station, the products are placed in the proper tote container at the picking station. The picking station may be a manual station (where workers place the products), an automated station (where robots place the products in the tote), or some combination of manual and automatic pick station.

At step 204, at least one sensor is provided. The at least one sensor obtains three-dimensional image information regarding the first tote container and the one or more products. The three-dimensional image information includes first dimensions of the first tote container and second dimensions of the one or more products. The first dimensions can include multiple dimensions (e.g., length, width, depth) of the first tote container and the second dimensions can include multiple dimensions (e.g., length, width, depth) of the products. The sensor may be disposed at the picking station, somewhere else in the retail store, distribution center, or warehouse, or at some other suitable location.

In these regards and as described elsewhere herein, once the image is taken, various image analysis and processing approaches can be used to determine dimensions of the tote container. For example, known image processing techniques can be used to determine the length, depth, and width of the tote container. For example, edges of the tote container can be identified by comparing the image to known edges. Similarly, known image processing techniques can be used to identify dimensions of the products in the tote container.

For example, edges of products can be identified based upon the shapes of known products and measurements determined. For instance, a bottle of catsup may be identified in the container based upon the shape of the bottle (which indicates that it is a product in the container and not a part of the container), and then the dimensions determined from the identified-shape. If the products in the tote are of the same type, the product dimensions can be taken from one product that is selected in the tote container or the dimensions obtained from multiple products in the tote container (where the measured dimensions are averaged). In a similar manner, the amount by which the tote container is filled is determined.

At step 206, a database is provided at a central location. The central location may be a company headquarters (physically and geographically separate from the retail store, warehouse, or distribution center). Alternatively, the database may be located somewhere in the retail store, distribution center, or warehouse. Other locations are possible. The predetermined (expected) dimensions of the tote, predetermined dimensions of each of the one or more products, and target container product fill amount are stored at the database.

These dimensions may be in any measurement units and may include dissensions such as the length, the width, the depth, circumference, diameter, and other dimensions. Other examples are possible.

At step 208, a control circuit compares the first dimensions of the tote container obtained by the sensors to the predetermined dimensions of the tote to determine the existence of a first discrepancy. In examples, the length of the tote is compared to the expected length of the tote and a difference (if any) is determined. It will be appreciated that a certain tolerance of differences can be considered and no discrepancy is determined if the difference is within the tolerance (e.g., no discrepancy can be determined if the difference is within 10% of the expected value).

At step 210, the control circuit compares the second dimensions of the one or more product to the predetermined dimensions of the one or more products to determine the existence of a second discrepancy. In examples, the length of the product is compared to the expected length of the product and a difference (if any) is determined. It will be appreciated that a certain tolerance to differences can be considered and no discrepancy is determined if the difference is within the tolerance (e.g., no discrepancy can be determined if the difference is within 10% of the expected value).

At step 212, the control circuit analyzes the three-dimensional image information to determine a product fill amount for the first tote container, and compares the product fill amount of the first tote container to the target container product fill amount to determine the existence of a third discrepancy. As before, it will be appreciated that a certain tolerance to differences can be considered and no discrepancy is determined if the difference is within the tolerance (e.g., no discrepancy can be determined if the difference is within 10% of the expected value).

At step 214 and when one or more of the first discrepancy, the second discrepancy, or the third discrepancy exists, the control circuit takes an action. It will be understood that various types of actions can be taken. In examples, the action is one of selecting a second tote container that is to be filled subsequent to the first tote container, the second tote container having different dimensions than the first time container; increasing the number of products inserted into a second tote container as compared to the number of products inserted into the first tote container; decreasing a number of products inserted into a second tote container as compared to the number of products inserted into the first tote container; or adjusting the target fill amount. Other examples of actions are possible.

It will also be understood that different combinations of discrepancies can be determined and utilized (e.g., the determination and utilization of a first discrepancy only, a second discrepancy only, a third discrepancy only, a first and second discrepancy only, a second and third discrepancy only, or a first and third discrepancy only). In these cases, the other steps are adjusted to take into account the reduced number of discrepancies being used.

Figure 3A:
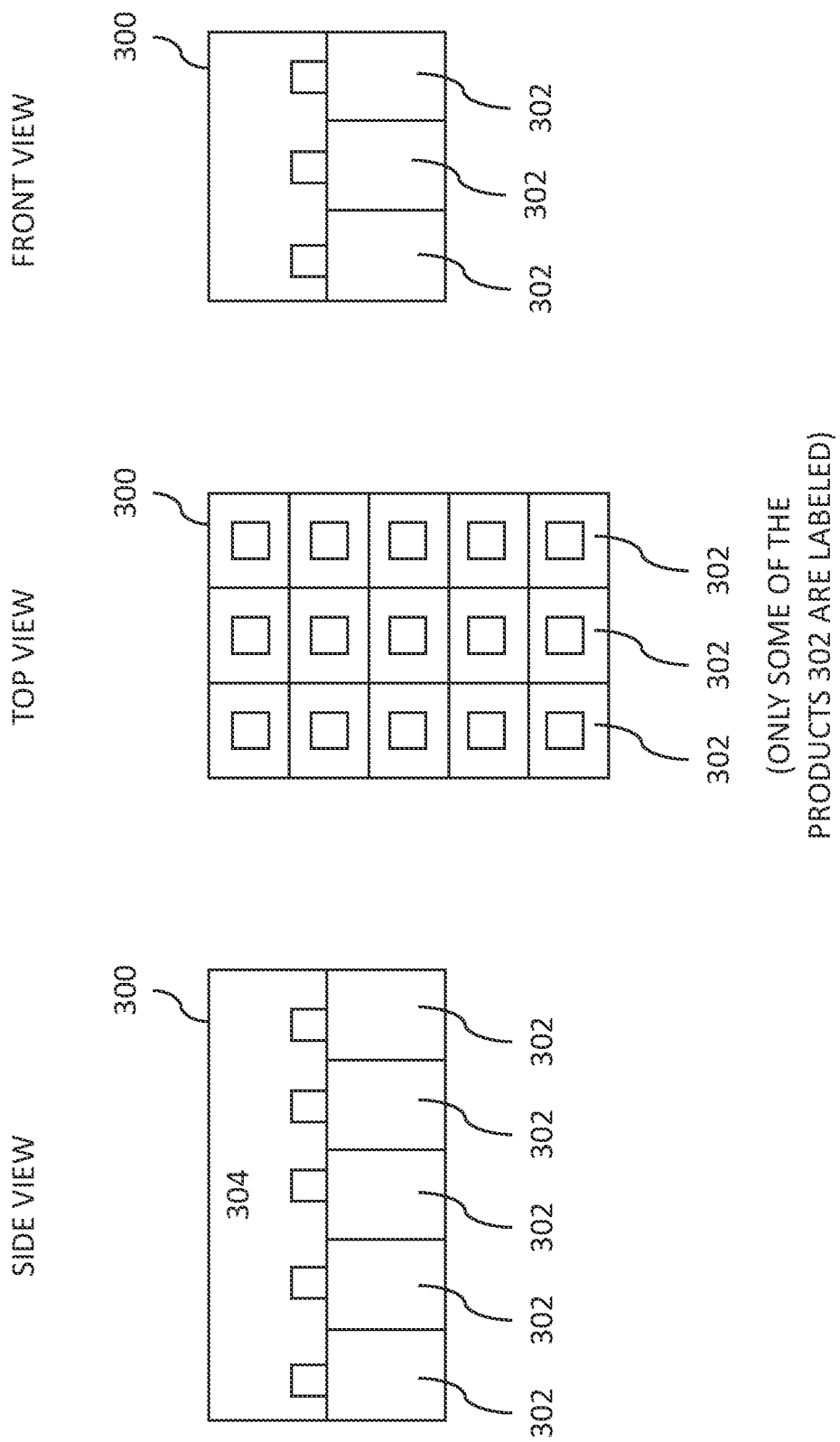
FIG. 3A comprises diagrams of a tote container configured of these approaches in accordance with various embodiments of these teachings.

Referring now to FIG. 3A, an example of a tote container 300 is described. The tote container 300 is shown with a side view, a top view, and a front view. The tote container 300 holds or stores products 302. In this case the products are identical. Open volume 304 exists at the top of the tote container 300.

It will be appreciated that this is an example of a tote container that is highly packed and may be around 90% filled by volume. It can be seen that there is no room to store or place other products in the tote container 300 as the only available open volume is the open volume 304 where additional products cannot be stored or placed. The approaches described herein determine that the tote container 300 is tightly packed and that no space exists for addition product in the tote container 300. These types of conclusions are determined as described above by determining discrepancies that exist between dimensions of the tote container (obtained by analyzing the images) and the predetermined dimensions of the tote, discrepancies existing between the dimensions of the one or more product (as determined by image analysis) and the predetermined dimensions of the one or more products, and discrepancies existing between the product fill amount of the tote container (as determined by image analysis) and the target container product fill amount. In one example, the approaches described herein determine that no additional products could be placed into the tote container 300.

Figure 3B:
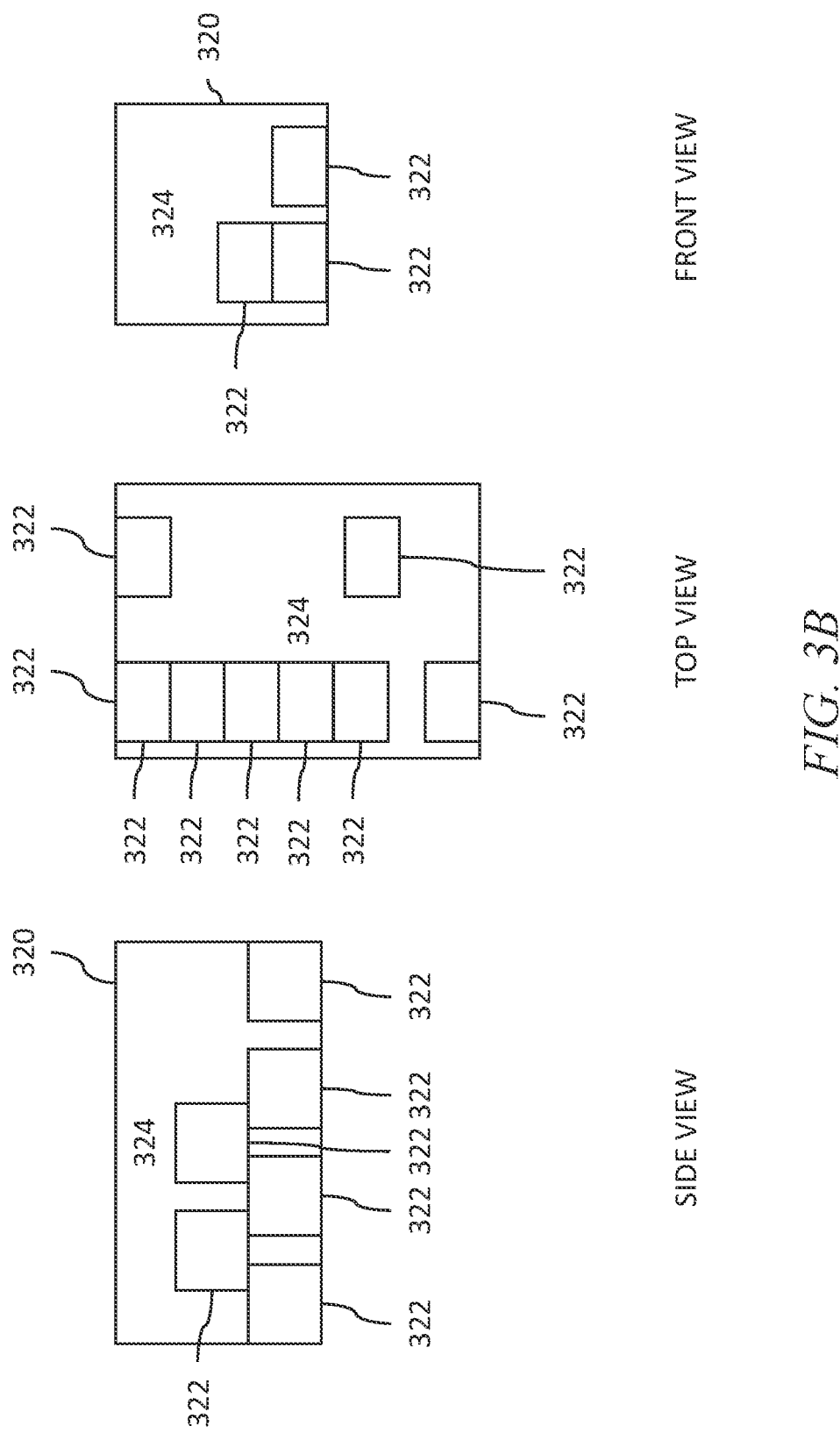
FIG. 3B comprises diagrams of a tote container configured of these approaches in accordance with various embodiments of these teachings.

Referring now to FIG. 3B, another example of a tote container 320 is described. The tote container 320 is shown with a side view, a top view, and a front view. The tote container 320 includes products 322. In this case the products are identical. Open volume 324 exists at various places in the tote container 320.

It will be appreciated that FIG. 3B is an example of a tote container that is not tightly packed and may be around 65% filled by volume. It can be seen that there is room to store or place other products in the tote container 320 in some of the open volumes 324 where additional products could be placed. The approaches described herein determine that the tote container 320 is not tightly packed and that volume exists for addition products in the tote container 320. This is determined by analyzing discrepancies existing between dimensions of the tote container (obtained by analyzing the images) and the predetermined dimensions of the tote, discrepancies existing between the dimensions of the one or more product (determined by image analysis) and the predetermined dimensions of the one or more products, and discrepancies existing between the product fill amount of the tote container (determined by image analysis) and the target container product fill amount. Consequently, the approaches described herein would determine that additional products could be placed into the tote container 320 in order to more efficiently and effectively use the tote container 320.

Figure 4:
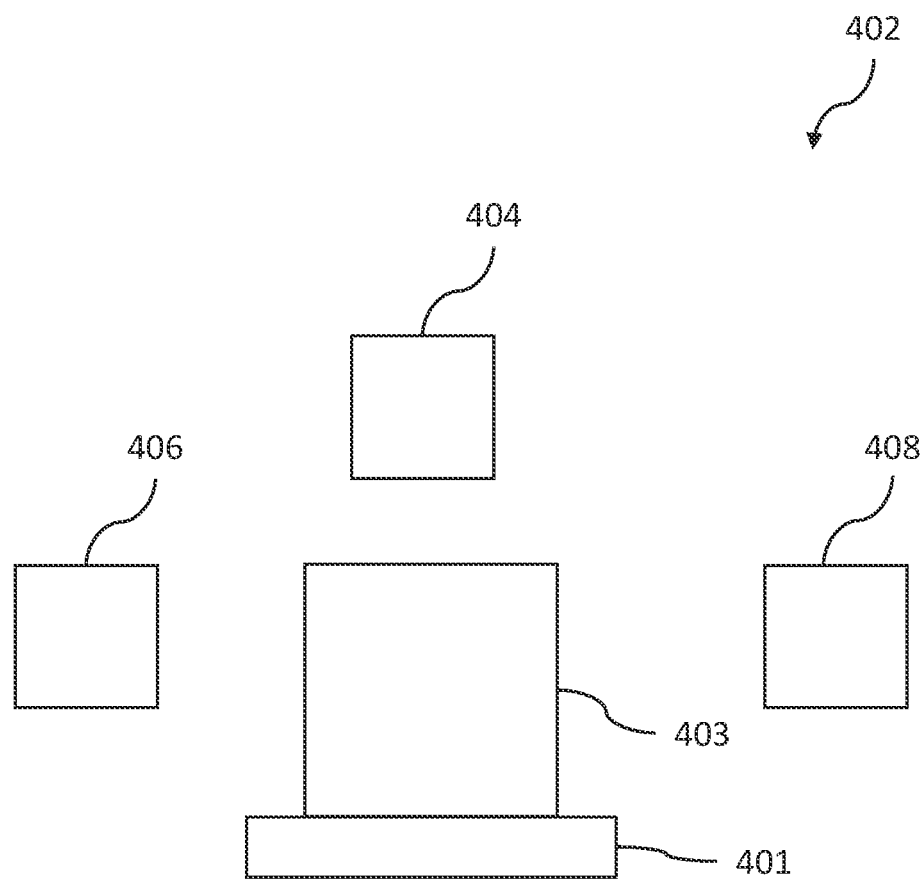
FIG. 4 comprises a diagram of sensor deployment as configured by these approaches in accordance with various embodiments of these teachings.

Referring now to FIG. 4, one example of sensor deployment is described. In this example, the sensors (that obtain the images as described herein) are deployed at a picker station 402. The picker or picking station 402 is any machine or system where products are received and deployed into tote containers. In these regards, the picking station 402 may include conveyor belts or other mechanisms to move products, and mechanisms to move products into totes. For example, robotic arms or levers may be used. In other example, the product movement can be performed manually by employees. In aspects, goods are received from shippers, placed on a surface 401, and then moved into a tote container 403. The tote container 403 is structured as any of the tote containers described herein, for example as a rectangular box that is structured to move the products from the picking station 402 to shelves in a retail store or within a warehouse. In aspects, the movement from the picking station 402 to the shelves may be manual (an employee moving the tote container 403, or automated by using an automated vehicle. In any case, the employee or the automated vehicle traverses through the physical environment of the retail store to the destination location where the products are desired.

The surface 401 is any type of surface to place a container. In examples, the surface 401 is a flat non-moving surface. In other examples, the surface 401 is or includes a conveyor belt. Other types of surfaces are possible.

In this example, a first sensor 404, a second sensor 406, and a third sensor 408 are deployed to scan tote containers and the contents of these containers. The first sensor 404 is above the surface 401. The second sensor 406 is on the one side of the tote container 403. The third sensor 408 is on the other side of the tote container 403. Although not shown, a fourth sensor may be deployed below the surface 401 or otherwise under the tote container 403. The sensors 404, 406, 408 may be attached any appropriate structure.

The sensors 404, 406, and 408, in one example, are millimeter wave sensors. In aspects, the images obtained by these sensors are three-dimensional images and can show filled and empty space within the tote container 403. Other examples of sensors (e.g., that obtain images in other radiation frequencies) such as x-rays may also be used. In examples, the sensors 404, 406, and 408 transmit millimeter waves from antennas. The wave energy reflected back from the tote container 403 (and the contents of the tote container 403) is used to construct images, which can be analyzed by a control circuit. If some areas of images from one sensor are indeterminate, hazy, garbled, unavailable, or unrecognizable, these areas or volumes can be supplemented with clear or determinate images of the same volume from others of the sensors 404, 406, and 408. The deployment of the sensors in such a way ensures that the tote container when scanned will receive maximum coverage (100 percent or close to 100 percent coverage).

Figure 5:
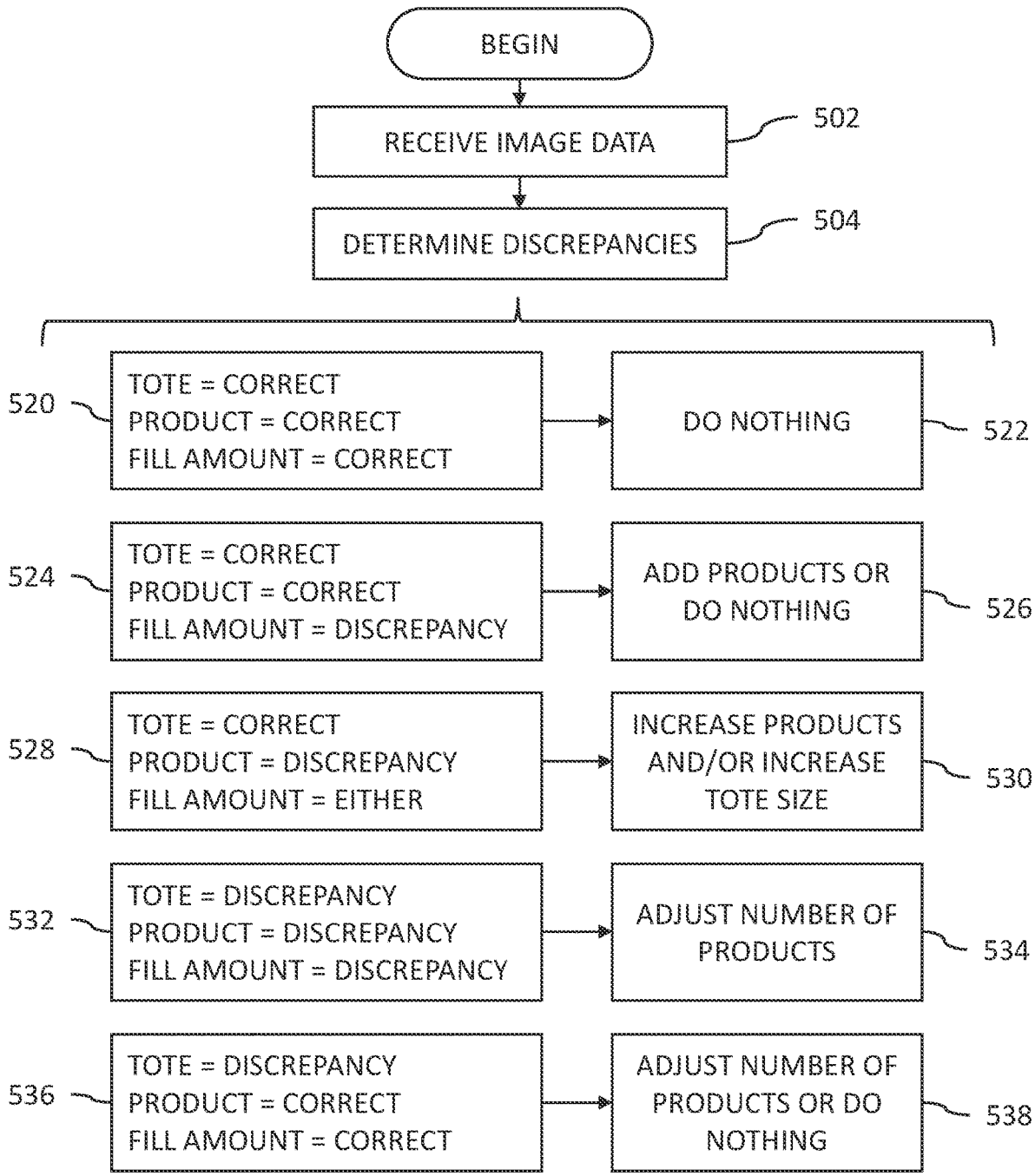
FIG. 5 comprises a flowchart as configured with various embodiments of these teachings.

Referring now to FIG. 5, an example of an approach to determine an action is described. At step 502, the images are received from the sensors and analyzed. Discrepancies are determined as described elsewhere herein at step 504. More specifically, the existence of discrepancies between dimensions of the tote container obtained by analyzing the images to the predetermined dimensions of the tote, discrepancies between the dimensions of the one or more product to the predetermined dimensions of the one or more products, and discrepancies between the product fill amount of the tote container and the target container product fill amount are determined. It may also be determined where the unused volume is located in a tote container and if products can be placed in this unused volume.

In this example, after the analysis is performed, actions are taken depending upon which combination of discrepancies are determined. It will be appreciated that this is one example of how to determine an action and that other examples are possible.

As shown, at step 520, the tote and products sizes are correct (there are no discrepancies between measured and expected values) and no discrepancy exists with target fill amount (there are no discrepancies between the measured and expected value). In this case, step 522 is performed where nothing (tote or contents) is changed either with the existing tote or future totes.

With step 524, no discrepancies exist between measured and expected tote and product sizes, but there is a discrepancy with the product fill amount. In this case, step 526 is performed where potentially more products are inserted into the tote (if there is sufficient available volume) or nothing is done (there is insufficient volume to insert more products into future totes). Various factors can be used to make this determination including the overall cost.

With step 528, the dimensions of the tote are correct (there is no discrepancy between measured and expected values), but there is a discrepancy between the measured product size and the expected product size. The product fill amount may be correct or incorrect (a discrepancy exists or does not exist with the expected target fill amount). In this case, step 530 is performed, which potentially increases the number of products in future tote containers when there is available volume or replaces the existing tote container with a different, e.g., increased, sized container. Various factors can be used to make these choices including overall cost.

With step 532, there is a discrepancy between the measured tote dimensions and the expected tote dimensions, there is a discrepancy between the measured and expected product size, and a discrepancy between the measured and expected product fill amount may or may not exist. In this case, step 534 is performed wherein the action selected is to potentially adjust the number of products in future tote containers. The amount of adjustment may be determined by available volume in the measured tote container and the location of this available volume.

With step 536, there is a discrepancy between the measured tote dimensions and the expected tote dimensions, but no discrepancies exist with the product size or product fill amount. In this case, step 538 is performed with the action selected being adjusting the number of products in future tote containers or doing nothing. Various factors can be used to make these choices including overall cost.

As mentioned, the example of FIG. 5 is one example of how to determine an action and other examples are possible. This approach may be implemented as a suitable combination of computer hardware and/or software. After the action is determined, it may be physically implemented. In addition, it will be understood that in some cases multiple actions can be performed (e.g., both increase the size of the tote container and increase the number of products inserted into the tote container).

Figure 6:
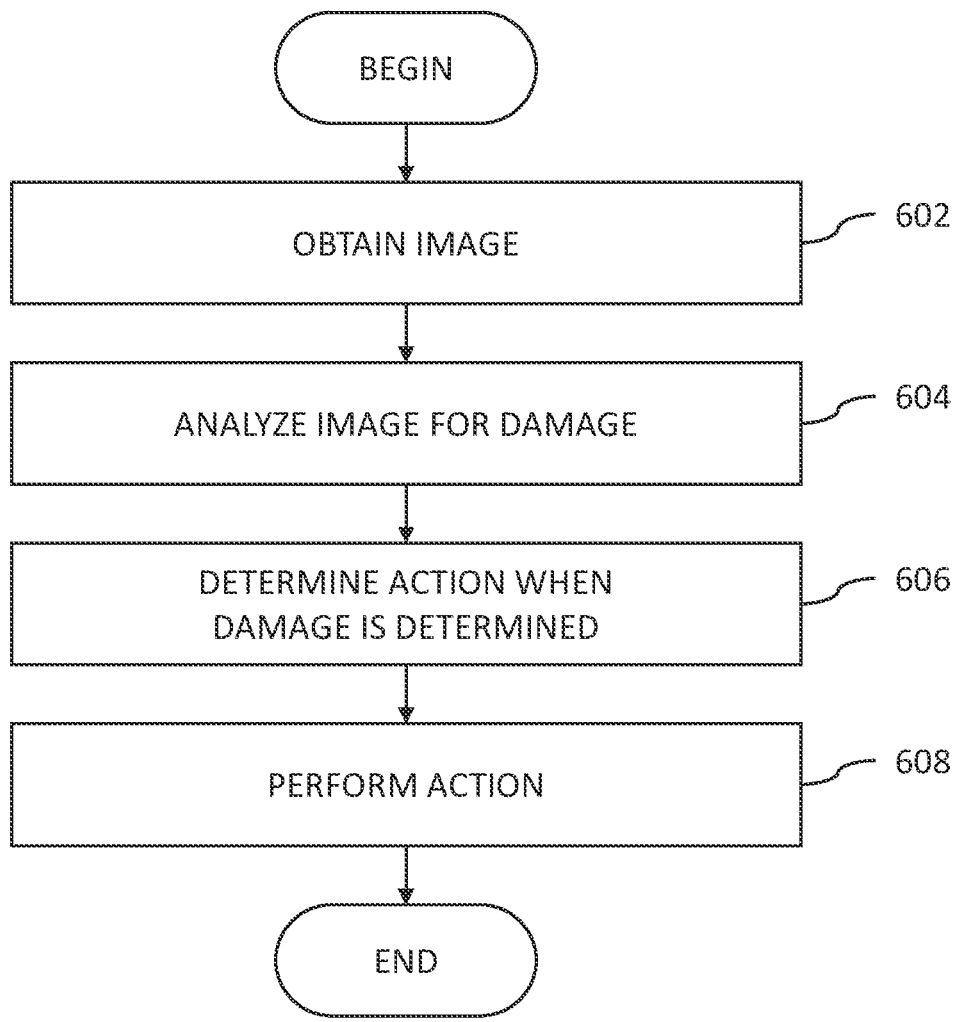
FIG. 6 comprises a flowchart as configured with various embodiments of these teachings.

Referring now to FIG. 6, one example of an approach for determining damage and then taking actions based upon the damage of contents of the tote.

At step 602, an image (e.g., a three-dimensional image) of a product and/or tote container is obtained.

At step 604, the image is analyzed and the analysis looks for damage of products and/or the tote container. If the product were a fruit, the analysis may look to see if the skin of the fruit is pierced, bruised, or dented. In examples, this may be done by comparing it to known damaged fruit. If the product were an electronic device (e.g., a smartphone) the analysis may look to see if the screen of the device is cracked or the case of the product is damaged by comparing it to known damaged products or by comparing it to known undamaged products and checking for a discrepancy.

At step 606, an action is determined when damage is determined. In aspects, actions may be mapped based on the type of damage to the product, the amount of damage to the product, or other factors. A mapping table may be used to implement this approach. For example, when the product is a fruit and the damage is detected where pieces of fruit touch each other, the size of the container is increased and packing materials may be inserted into the tote container.

At step 608, the action is performed. For instance, the number of products inserted into future totes may be decreased. Protective material (e.g., cushioning material) may be inserted into the tote. Other examples are possible.

For damaged totes, the tote can be flagged as being damaged and can be replaced at the picker station, the next station, or some other appropriate place in the store, warehouse, or distribution center. Messages can be sent to employees and/or automated vehicles alerting the employees and/or automated vehicles that the tote and/or contents of a tote have been damaged and that action should be taken.

Figure 7:
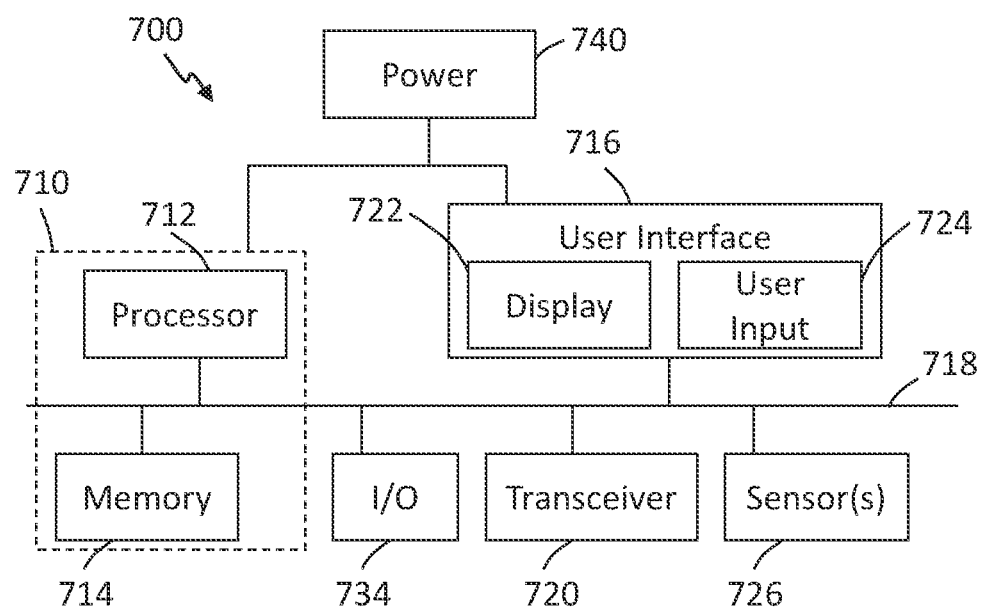
FIG. 7 comprises a diagram of a system as configured in accordance with various embodiments of these teachings.

Further, the circuits, circuitry, systems, devices, processes, methods, techniques, functionality, services, servers, sources and the like described herein may be utilized, implemented and/or run on many different types of devices and/or systems. FIG. 7 illustrates an exemplary system 700 that may be used for implementing any of the components, circuits, circuitry, systems, functionality, apparatuses, processes, or devices of the system 100 of FIG. 1, and/or other above or below mentioned systems or devices, or parts of such circuits, circuitry, functionality, systems, apparatuses, processes, or devices. For example, the system 700 may be used to implement some or all of the control circuit 108, one or more of the databases, and/or other such components, circuitry, functionality and/or devices. However, the use of the system 700 or any portion thereof is certainly not required.

By way of example, the system 700 may comprise a processor module 712, memory 714, and one or more communication links, paths, buses or the like 718. Some embodiments may include one or more user interfaces 716, and/or one or more internal and/or external power sources or supplies 740. The processor module 712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the processor module 712 can be part of control circuitry and/or a control system 710, which may be implemented through one or more processors with access to one or more memory 714 that can store commands, instructions, code and the like that is implemented by the processor module to implement intended functionality. In some applications, the processor module and/or memory may be distributed over a communications network (e.g., LAN, WAN, Internet) providing distributed and/or redundant processing and functionality. Again, the system 700 may be used to implement one or more of the above or below, or parts of, components, circuits, systems, processes and the like.

The user interface 716 can allow a user to interact with the system 700 and receive information through the system. In some instances, the user interface 716 includes a display 722 and/or one or more user inputs 724, such as buttons, touch screen, track ball, keyboard, mouse, etc., which can be part of or wired or wirelessly coupled with the system 700. Typically, the system 700 further includes one or more communication interfaces, ports, transceivers 720 and the like allowing the system 700 to communicate over a communication bus, a distributed computer and/or communication network 105 (e.g., a local area network (LAN), the Internet, wide area network (WAN), etc.), communication link 718, other networks or communication channels with other devices and/or other such communications or combination of two or more of such communication methods. Further the transceiver 720 can be configured for wired, wireless, optical, fiber optical cable, satellite, or other such communication configurations or combinations of two or more of such communications. Some embodiments include one or more input/output (I/O) ports 734 that allow one or more devices to couple with the system 700. The I/O ports can be substantially any relevant port or combinations of ports, such as but not limited to USB, Ethernet, or other such ports. The I/O interface 734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 726 (e.g., sensor 104 in FIG. 1) to provide information to the system and/or sensor information that is communicated to another component, such as the central control system, a delivery vehicle, etc. The sensors can include substantially any relevant sensor, such as distance measurement sensors (e.g., optical units, sound/ultrasound units, etc.), optical-based scanning sensors to sense and read optical patterns (e.g., bar codes), radio frequency identification (RFID) tag reader sensors capable of reading RFID tags in proximity to the sensor, imaging system and/or camera, other such sensors or a combination of two or more of such sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 700 comprises an example of a control and/or processor-based system with the processor module 712. Again, the processor module 712 can be implemented through one or more processors, controllers, central processing units, logic, software and the like. Further, in some implementations the processor module 712 may provide multiprocessor functionality.

The memory 714, which can be accessed by the processor module 712, typically includes one or more processor-readable and/or computer-readable media accessed by at least the processor module 712, and can include volatile and/or nonvolatile media, such as RAM, ROM, EEPROM, flash memory and/or other memory technology. Further, the memory 714 is shown as internal to the control system 710;

however, the memory 714 can be internal, external or a combination of internal and external memory. Similarly, some or all of the memory 714 can be internal, external or a combination of internal and external memory of the processor module 712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 105. The memory 714 can store code, software, executables, scripts, data, content, lists, programming, programs, log or history data, user information, customer information, product information, and the like. While FIG. 7 illustrates the various components being coupled together via a bus, it is understood that the various components may actually be coupled to the control circuit and/or one or more other components directly.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for determining information concerning products being carried by tote containers, the system comprising:
    a picker station including a conveyor device and a robotic arm;
    a first tote container, the first tote container being filled with one or more products and being moved by the conveyor device;
    at least one sensor arranged about the conveyor device, the at least one sensor obtaining sizing information regarding-dimensions of the first tote container and dimensions of the one or more products;
    a database, the database storing predetermined dimensions of the first tote container and each of the one or more products, and a target container product fill amount;
    a control circuit, the control circuit coupled to the database and to the sensor, the control circuit configured to:
        analyze the sizing information to determine a product fill amount for the first tote container;
        compare the sizing information to the predetermined dimensions of the first tote container and each of the one or more products, and compare the product fill amount to the target container product fill amount to determine whether discrepancies exist and a total number of discrepancies;
        when discrepancies exist, take an action, with respect to a second tote container that is to be filled and is moved by the conveyor device, to perform a better the action selected based upon types of the discrepancies, a combination of discrepancies detected, and the total number of discrepancies detected and being one of:
            selecting a second tote container that is to be filled subsequent to filling the first tote container, wherein the second tote container has different dimensions than the first tote container;
            increasing a number of products inserted into a second tote container, by the robotic arm, as being compared to a number of products inserted into the first tote container by the robotic arm;
            decreasing a number of products inserted into a second tote container, by the robotic arm, as being compared to a number of products inserted into the first tote container by the robotic arm; or
            adjusting the target container product fill amount for the second container;
        wherein the action is effective to perform better estimations for future allocation of totes;
        wherein the sensor is used to determine damage to the first tote container, wherein when the damage is determined, the first tote container is exchanged for a larger container and/or the number of products is decreased.

2. The system of claim 1, wherein the control circuit analyzes the sizing information to determine any damage for the one or more products.

3. The system of claim 2, wherein when damage is determined, the number of products inserted into the second tote container by the robotic arm as compared to the number of products inserted into the first tote container by the robotic arm is decreased.

4. The system of claim 2, wherein the damage is linked to the first tote container.

5. The system of claim 1, wherein the at least one sensor comprises a millimeter wave sensor.

6. The system of claim 1, wherein the at least one sensor comprises a first sensor and a second sensor, and each of the first sensor and the second sensor uses a different kind of sensing technology.

7. The system of claim 1, wherein the target container fill amount comprises a percentage.

8. The system of claim 1, wherein the sizing information is analyzed to determine an amount of empty space in the first tote container.

9. The system of claim 1, wherein the control circuit is deployed at the picker station.

10. The system of claim 1, wherein the target container fill amount is part of business rules of how much the first tote container should be filled.

11. A method for determining information concerning products being carried by tote containers, the method comprising:
    providing a picker station including a conveyor device and a robotic arm;
    providing a first tote container, the first tote container being filled with one or more products and being moved by the conveyor device;
    providing at least one sensor arranged about the conveyor device, the at least one sensor obtaining sizing information regarding dimensions of the first tote container and dimensions of the one or more products;
    providing a database, the database storing predetermined dimensions of the first tote container and each of the one or more products, and a target container product fill amount;
    providing a control circuit, the control circuit coupled to the database and to the sensor;
    by the control circuit, analyzing the sizing information to determine a product fill amount for the first tote container;
    by the control circuit, comparing the sizing information to the predetermined dimensions of the first tote container and each of the one or more products, and compare the product fill amount to the target container product fill amount to determine whether discrepancies exist and a total number of discrepancies;
    by the control circuit, determining, when discrepancies exist, an action to take with respect to a second tote container that is to be filled and is moved by the conveyor device, the action selected based upon types of the discrepancies, a combination of discrepancies detected, and the total number of discrepancies detected and being one of:

selecting a second tote container that is to be filled subsequent to filling the first tote container, wherein the second tote container has different dimensions than the first tote container;

increasing a number of products inserted into a second tote container by the robotic arm as compared to a number of products inserted into the first tote container by the robotic arm;

decreasing a number of products inserted into a second tote container by the robotic arm as compared to a number of products inserted into the first tote container by the robotic arm; or adjusting the target container product fill amount for the second container, wherein the action is effective to perform better estimations for future allocation of totes;

wherein the sensor is used to determine damage to the first tote container, wherein when the damage is determined, the first tote container is exchanged for a larger container and/or the number of products is decreased.

12. The method of claim 11, further comprising, analyzing, by the control circuit, the sizing information to determine any damage for the one or more products.

13. The method of claim 12, wherein when damage is determined, the number of products inserted into the second tote container by the robotic arm as compared to the number of products inserted into the first tote container by the robotic arm is decreased.

14. The method of claim 12, further comprising linking the damage to the first tote container.

15. The method of claim 11, wherein the at least one sensor comprises a millimeter wave sensor.

16. The method of claim 11, wherein the at least one sensor comprises a first sensor and a second sensor, and each of the first sensor and the second sensor uses a different kind of sensing technology.

17. The method of claim 11, wherein the target container fill amount comprises a percentage.

18. The method of claim 11, further comprising analyzing the sizing information to determine an amount of empty space in the first tote container.

19. The method of claim 11, further comprising deploying the control circuit at the picker station.

20. The method of claim 11, wherein the target container fill amount is part of business rules of how much the first tote container should be filled.

* * * * *